United States Patent
Burklin

(10) Patent No.: US 8,282,055 B2
(45) Date of Patent: Oct. 9, 2012

(54) TRIPOD HEAD

(75) Inventor: Werner Burklin, Emmendingen (DE)

(73) Assignee: FLM GmbH Foto-, Licht- und Messtechnisches Zubehoer, Emmendingen (DE)

( * ) Notice: Subject to any disclaimer, the term of this patent is extended or adjusted under 35 U.S.C. 154(b) by 210 days.

(21) Appl. No.: 12/740,225

(22) PCT Filed: Oct. 21, 2008

(86) PCT No.: PCT/EP2008/008892
§ 371 (c)(1),
(2), (4) Date: Apr. 28, 2010

(87) PCT Pub. No.: WO2009/056249
PCT Pub. Date: May 7, 2009

(65) Prior Publication Data
US 2010/0264282 A1    Oct. 21, 2010

(30) Foreign Application Priority Data
Oct. 30, 2007   (DE) .................. 10 2007 052 039

(51) Int. Cl.
*F16M 11/04*    (2006.01)
(52) U.S. Cl. ............... 248/187.1; 248/124.2; 248/181.1; 396/419; 396/428

(58) Field of Classification Search ............... 248/124.2, 248/223.41, 224.51, 288.31, 288.51, 177.1, 248/178.1, 181.1, 187.1, 316.1; 396/419, 396/428
See application file for complete search history.

(56) References Cited

U.S. PATENT DOCUMENTS

| | | | |
|---|---|---|---|
| 3,612,462 A | 10/1971 | Mooney | |
| 3,737,130 A * | 6/1973 | Shiraishi | 248/181.1 |
| 6,352,228 B1 * | 3/2002 | Buerklin | 248/181.1 |
| 6,773,172 B1 * | 8/2004 | Johnson et al. | 396/428 |
| 6,827,319 B2 * | 12/2004 | Mayr | 248/187.1 |
| 7,185,862 B1 * | 3/2007 | Yang | 248/187.1 |
| 7,300,028 B2 * | 11/2007 | Vogt | 248/181.1 |
| 7,409,791 B2 * | 8/2008 | Moody et al. | 42/72 |
| 7,572,074 B2 * | 8/2009 | Teratani | 396/428 |
| 7,621,492 B2 * | 11/2009 | Omps | 248/181.1 |
| 2007/0147829 A1 | 6/2007 | Teratani | |

FOREIGN PATENT DOCUMENTS

| | | |
|---|---|---|
| DE | 2747677 | 4/1979 |
| DE | 102007001580 | 7/2007 |
| EP | 1365187 | 11/2003 |
| EP | 1473510 | 11/2004 |
| FR | 2799807 | 4/2001 |

* cited by examiner

*Primary Examiner* — Anita M King
(74) *Attorney, Agent, or Firm* — Volpe and Koenig, P.C.

(57) ABSTRACT

The invention relates to a tripod head having an inclination apparatus (2) having universal joint (5) and having a holding apparatus (100), which can be secured on the universal joint, for holding a camera, a pair of binoculars, a spotting scope or such an optical instrument with a removable disk (101).

5 Claims, 3 Drawing Sheets

TRIPOD HEAD

BACKGROUND

The invention relates to a tripod head having an inclination apparatus with a universal joint, which exhibits a ball joint that is mounted so that it can swivel in a bearing housing and accommodated between two slide bearings in a bearing housing, of which one of the slide bearings is mounted in the bearing housing so that it can shift axially in the spacing direction of the slide bearings, wherein the universal joint is arranged between connecting points situated at ends of the tripod head facing away from each other, of which one is or can be connected with a camera, a spotting scope, a pair of binoculars or similar optical instrument, and the other is or can be connected with at least one tripod leg or similar holder.

For example, such an inclination unit is known from German Patent Application 10 2007 001 580 A1. However, the axially shifting slide bearing is here only supported at one location by a conical pin. The small supporting surface keeps the force with which the slide bearing can be pressed against the universal joint correspondingly low. This results in an only slight overall load-bearing capacity for the entire tripod head. In addition, the unilateral exposure to force generates a tilting moment, which can cause the slide bearing in the bearing housing to jam, thereby potentially damaging the bearing housing or the slide bearing.

Previously known from EP 1 473 510 A1 is a tripod head having a cylindrical bearing housing, which incorporates a ball joint that can rotate and swivel therein. The bearing housing of the previously known tripod head also incorporates a bearing element that can axially shift and rotate therein, which exhibits a sliding surface that abuts the circumference of the ball joint. The bearing element has allocated to it a support that is actively connected with a final control element in such a way that the bearing element can be shifted against the ball joint to achieve the clamping action. This final control element has circular arc units connected with each other via an adjusting screw, wherein the adjusting screw has oppositely threaded segments in the area of the units. These units are provided with mutually parallel inclined surfaces, which interact with a complementary counter-inclination on the face of the support facing away from the ball joint. Additional tripod heads with inclination apparatuses are also known from FR 2 799 807 A and US 2007/147829 A1.

The inclinations and counter-inclinations provided in the tripod head previously known from EP 1 473 510 A1 must overcome high frictional forces in order to transform the relative motion of the units relative to each other as imparted by the adjusting screw into an axial adjusting motion of the support and bearing element located thereon in the clamping direction to the ball joint. The high frictional forces make it virtually impossible to expose the ball joints to the clamping forces that would be required to securely clamp a ball joint under a heavy load. Therefore, the tripod head previously known from EP 1 473 510 A1 is less well suitable for heavy cameras or similar optical devices.

Also disadvantageous is that comparatively high frictional forces must be overcome to loosen the clamped connection between the ball joint and bearing element and move the units into their initial position for this purpose.

Already previously known from DE 27 47 677 A1 is a tripod head with an exchangeable plate, to which a camera, a spotting scope, a pair of binoculars or similar optical device can be attached. This exchangeable plate has allocated to it a base, which can be secured to a tripod or similar supporting frame. The base is provided with a dovetail guide with a guide rail for shiftably mounting the exchangeable plate and a clamping device that can move relative to the base for securing the exchangeable plate in the guide rail. The clamping device can be designed as a pivoted lever, which can be turned between an open position that releases the exchangeable plate for removal and a closed position, wherein the exchangeable plate is accommodated so that it can shift in the guide in this closed position. While the pivoted lever releases the recess in the base intended for the exchangeable plate in its open position, the exchangeable plate is blocked in the closed position of the pivoted lever of the base. Since the exchangeable plate is still secured in the base in the open position, and the pivoted lever must still be turned to secure the exchangeable plate in the base, the previously known tripod head is cumbersome for a single person to operate, especially if this person wishes to attach a heavy optical device to the tripod head previously known from DE 27 47 677 A1. Exchangeable plates for tripod heads are also known from U.S. Pat. No. 3,612,462 and EP 1 365 187 A1, wherein the exchangeable plate is provided with a safeguard, but the latter threatens to spontaneously open under a load if the clamping device situated there tilts, making this tripod head only conditionally suitable for a rapid exchange of the optical instrument on the tripod.

SUMMARY

Therefore, the object is to create a tripod head that enables a simple and reliable positioning of the respective instrument while maintaining an elevated carrying power, with the ability to rapidly exchange the instrument on the tripod.

One aspect provides a tripod head comprising an inclination apparatus with a universal joint, which includes a ball joint that is mounted so that it can swivel in a bearing housing and accommodated between two slide bearings in the bearing housing, of which one of the slide bearings is mounted in the bearing housing so that it can shift axially in a spacing direction of the slide bearings, the universal joint is arranged between connecting points situated at ends of the inclination apparatus facing away from each other, of which one is adapted to be connected with a camera, a spotting scope, a pair of binoculars or similar optical instrument, or a holding device, and the other is adapted to be connected with at least one tripod leg or similar holder, the bearing housing includes a clamping ring that can expand at a gap and has an inclined surface that tapers relative to a longitudinal central plane toward the ball joint, and the inclined surface interacts with a complementarily shaped counter-inclination on the axially shifting slide bearing.

Another aspect provides a tripod comprising a holding device for accommodating a camera, a pair of binoculars, a spotting scope or similar optical instrument with an exchangeable plate, a base for mounting to a tripod or similar supporting frame, which is provided with a dovetail guide with a guide rail for shiftably mounting the exchangeable plate and a clamping device that can move relative to the base for securing the exchangeable plate in the guide rail, the guide rail of the dovetail guide is longitudinally molded onto the base, and the clamping device has two positions, in which the exchangeable plate is accommodated so that it can shift in the guide in a closed position, and the exchangeable plate is released for accommodation purposes in an open position, the clamping device can be transferred from the open position into the closed position by placement of the of the exchangeable plate that can be connected with the optical instrument, a longitudinal side of the base lying opposite the guide rail has arranged on it a groove in which the clamping device which is cylindrical is mounted so that it can rotate around a longitudinal axis, which has a longitudinally oriented, segmented opening that forms a counter-guide of the dovetail guide, and the clamping device is provided with a spring-loaded safeguard to prevent inadvertent turning of the clamping device. For example, the holding device with exchangeable plate described is used in photography or filming to be able to comfortably switch between various cameras, even heavy and unwieldy cameras, with different films or lenses on a tripod, without having to take the complicated step of unscrewing the camera from the tripod head.

For this reason, the exchange systems that have become popular in larger and heavier optical instruments are those in which an exchangeable plate is attached to the optical instrument, most often with several screws, and the exchangeable plate is secured to the tripod head. Systems with dovetail guides are here known, wherein the exchangeable plate is inserted into the guide, and can be secured against shifting by a locking device. Since the exchangeable plate most often is small in comparison to the optical instrument, and hence not visible from above, threading the exchangeable plate requires that the user either feel around for the guide or bend over, both of which are cumbersome if not impossible given a correspondingly heavy optical instrument.

Therefore, the object of the invention is to provide a tripod head with a higher carrying power in comparison to prior art, and permits simple exchanges, in particular with regard to heavy optical instruments.

This object is achieved according to the invention by having the bearing housing incorporate a clamping ring that can expand at a gap and has an inclined surface that tapers relative to the longitudinal central plane toward the ball joint, and the inclined surface interacts with a complementarily shaped counter-inclination on the axially shifting slide bearing.

If the clamping ring is now expanded, the slide bearing slides on the inclined surface in an axial direction against the ball joint, and presses it against the second, fixed slide bearing.

The clamping ring is here fixed in position on the other side by a retaining ring or similar means, preventing any other evasion movement.

Since the clamping ring interacts with the slide bearing completely with the exception of the narrow gap, the axial force is uniformly distributed over the circumference of the slide bearing, so that no tilting moment comes about. This virtually precludes any damage to the slide bearing or bearing housing caused by jamming.

In addition, a significantly greater contact pressure can be applied to the ball joints as a result, thereby significantly increasing the load-bearing capacity for the tripod head by comparison to prior art.

This object is also achieved by mounting the clamping device so that it can rotate around a longitudinal axis, and giving it essentially two positions, wherein the exchangeable plate is held in the guide so that it can shift in a first position, and the exchangeable plate is released for removal in a second position.

The clamping device of the holding device according to the invention is used as part of the guide on the one hand so as to guide the exchangeable plate by shifting it along the longitudinal axis, and be able to fix it in a desired position. This is important for aligning the held optical instrument.

In the open position, the holding device additionally makes it possible to conveniently insert the exchangeable plate, and hence the optical instrument, from the broad side. This eliminates the cumbersome step of threading in the exchangeable plate from the narrow side into the guide. In particular when using heavy and/or awkwardly shaped optical instruments, this attachment option makes things enormously easier, since the guide most often invisibly disappears under the optical instrument, and can at best be made out by touching. In the horizontal position of the holding device, the exchangeable plate can now be easily hooked into the holding device from above, which is also easily possible with heavy devices.

A safeguard also prevents the clamping device from detaching, so that the exchangeable plate cannot inadvertently tilt out of the guide. Another safeguard also prevents the exchangeable plate from being inadvertently shifted out of the guide in the longitudinal direction.

In sum, the inclination and holding device according to the invention yields a tripod head that can carry a heavy load while at the same time being easy to operate, in particular when changing out the optical instruments.

BRIEF DESCRIPTION OF THE DRAWINGS

Additional advantageous features of the invention can be gleaned from the subclaims and exemplary embodiment, which is explained in greater detail below based on the drawings.

Shown on.

DETAILED DESCRIPTION OF THE PREFERRED EMBODIMENTS

Figure 1:
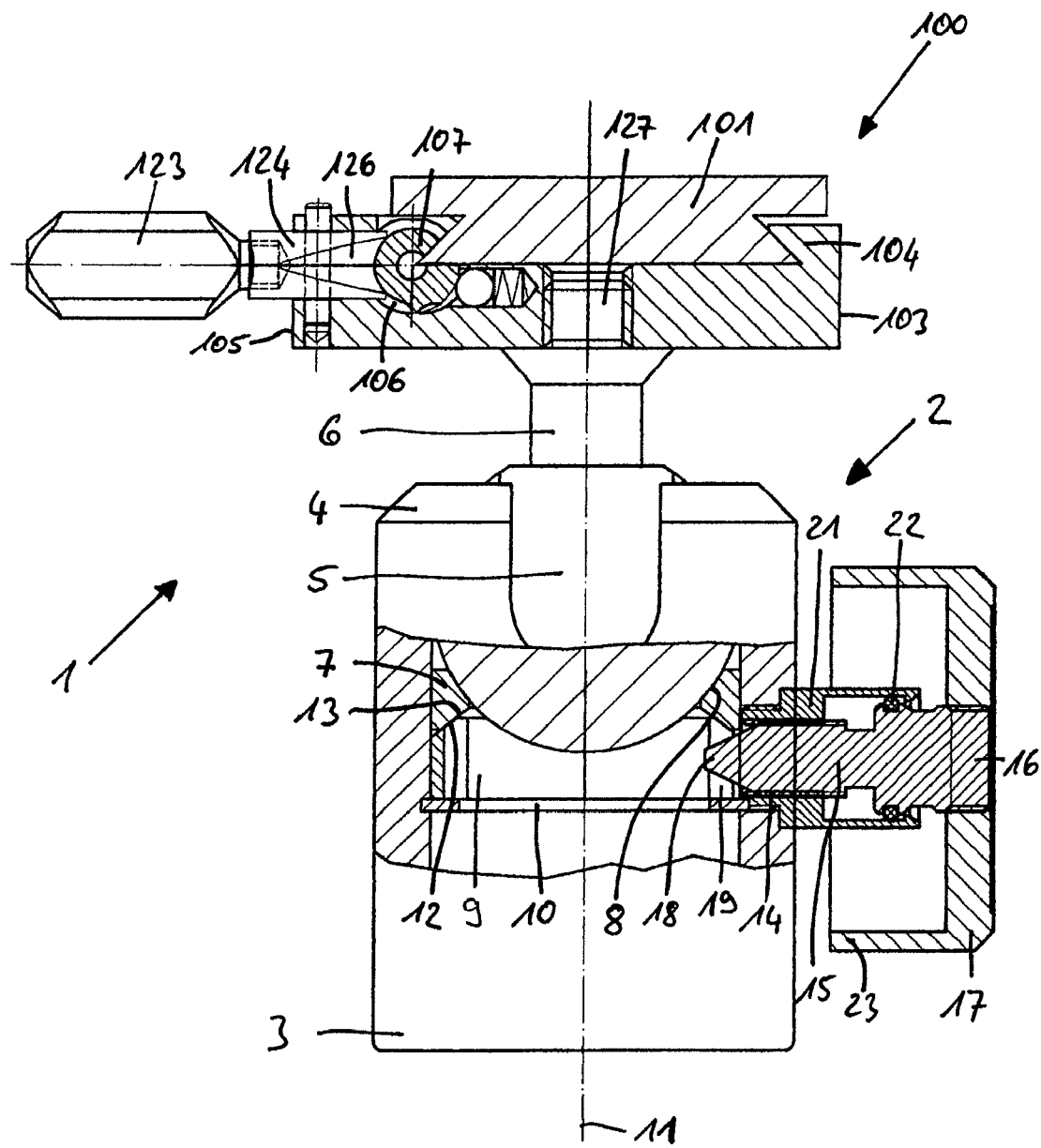
FIG. 1 is a longitudinal section through a tripod head according to the invention, with holding device and exchangeable plate.

FIG. 1 shows a tripod head marked 1 overall, with an inclination apparatus 2 and a holding device 100 with a quick-exchange plate 101 attached thereto.

The inclination apparatus 2 has a roughly cylindrical bearing housing 3, which is designed as a hollow cylinder. A flange not visible in the figure and directed inwardly at a right angle is arranged at its upper end 4, forming an upper bearing shell for a universal joint. The flange also accommodates a slide bearing with a preferably spherical sliding surface that interacts with a ball joint 5 and is also not visible in the partial sectional view.

In the axial direction of the bearing housing 3, the ball joint 5 has a straight extension 6 with a thread to which a rated load can be secured. Situated under the ball joint 5 is another axially shifting slide bearing 7 with a spherical bearing surface 8 adjusted to the ball 5. The slide bearing 7 adjoins a clamping ring 9. The entire arrangement is supported from below by an abutment, and thereby held in the bearing housing 3.

The clamping ring 9 has a reduced circumference in comparison to the inner diameter of the bearing housing 3. The upper edge of the clamping ring 9 further has an inclined surface 12 that tapers toward the longitudinal central axis 11 in the direction of the ball joint 5 and interacts with a complementarily shaped counter-inclination 13 on the bottom side of the slide bearing 7.

Situated in the bearing housing 3 at roughly the height of the clamping ring 9 is a threaded hole 14, in which a threaded bolt 15 can be moved transverse to the longitudinal central axis 11 of the bearing housing 3. The outer end 16 of the threaded bolt 15 accommodates a hand wheel 17 for manual actuation. The inner end 18 runs roughly conically inward, and engages an axial gap 19 in the clamping ring 9. The gap 19 here interacts with the conical end 18 of the threaded bolt 15 in such a way as that the clamping ring 9 is expanded as the threaded bolt 15 increasingly penetrates into the gap 19. The clamping ring 9 has a weakened material section 20 at roughly the gap 19 to facilitate expansion.

As the clamping ring 9 expands, the interaction between the inclined surfaces 12, 13 displaces the lower slide bearing 7 axially toward the ball joint 5, thereby generating a higher contact pressure. As a result, the ball joint 5 is pressed more tightly against the upper slide bearing, and fixed in place by the higher level of friction. The ball joint 5 is held more tightly because the clamping ring 9 expands to a greater extent.

Since the clamping ring 9 acts uniformly over the entire circumference of the slide bearing 7, there is a very homogeneous exposure to forces. This clamping process does not result in any torque or tilting moments on the slide bearing 7, thereby virtually precluding damages to the bearing housing 3 or slide bearing 7 owing to jamming. In addition, the complete support of the slide bearing 7 makes the carrying power of the inclination apparatus 2 significantly higher than in prior art.

When turning out the threaded bolt 15, the clamping ring is drawn together again by the intrinsic elastic spring force. The force of gravity allows the slide bearing 7 to slide down, thereby releasing the ball joint 5 for movements.

In order to guard against contamination, the threaded bolt 15 is enveloped by a cylindrical bushing 21 molded onto the bearing housing 3, wherein a groove on the threaded bolt 15 incorporates an O-ring, which on the other side abuts the inner wall of the bushing 21. The hand wheel 17 at the end of the threaded bolt 15 has an edge 23 that runs toward the bearing housing 3, overlaps the bushing 21 and impedes dirt from getting to the bushing 21.

Figure 2:
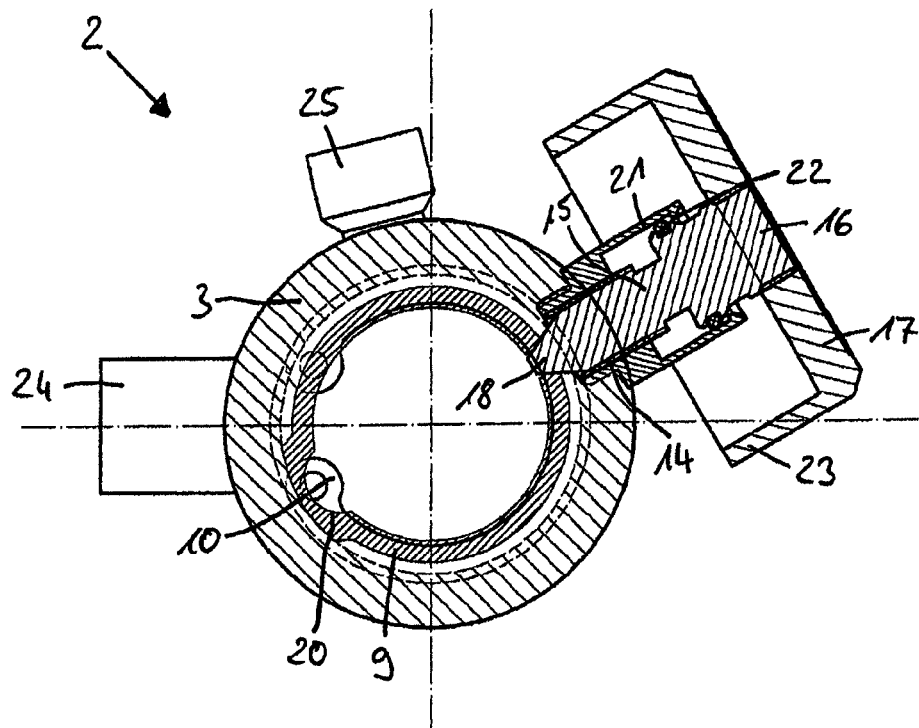
FIG. 2 is a cross section through the tripod head.

As evident from FIG. 2, the clamping ring 9 in the relaxed state only abuts the bearing housing inner wall in the area of the weakened material section 20, so as to leave enough room for expansion. The gap 19 in the clamping ring 9 is roughly as wide in the normal state as the material thickness. The abutment 10 is formed by a locking ring in the exemplary embodiment, which is arranged in a continuous inner groove in the bearing housing under the clamping ring 9. The two other molded on bushings 24, 25 are provided for additional functions, but these are not the subject matter of the invention.

FIG. 1 further depicts a holding device 100, which essentially exhibits a base 102 with a central threaded hole 127, into which the threaded extension 6 of the ball joint 5 is screwed.

The base 102 has a receptacle designed as a dovetail guide for an exchangeable plate 101. The exchangeable plate 101 is attached to an optical instrument that is to be joined with the base 102.

A guide rail 104 of the dovetail guide is molded onto a longitudinal side 103 of the roughly rectangular base 102. Situated on the opposing longitudinal side 105 of the base 102 is a roughly cylindrical groove 106, into which a cylindrical clamping device 107 is placed. To keep the clamping device 107 from falling out of the groove 106 in the longitudinal direction, a collar 108 projecting over the groove 106 is molded onto both respective ends of the clamping device 107. The clamping device 107 has a segmented opening 109 that is continuous in the longitudinal direction 128, and forms the counter-guide of the dovetail guide. According to the invention, the clamping device 107 is rotatably mounted in the groove 106, and has essentially two positions.

In the closed position depicted on FIG. 1, an inserted exchangeable plate 101 is held so that it can shift in the guide.

Figure 3:
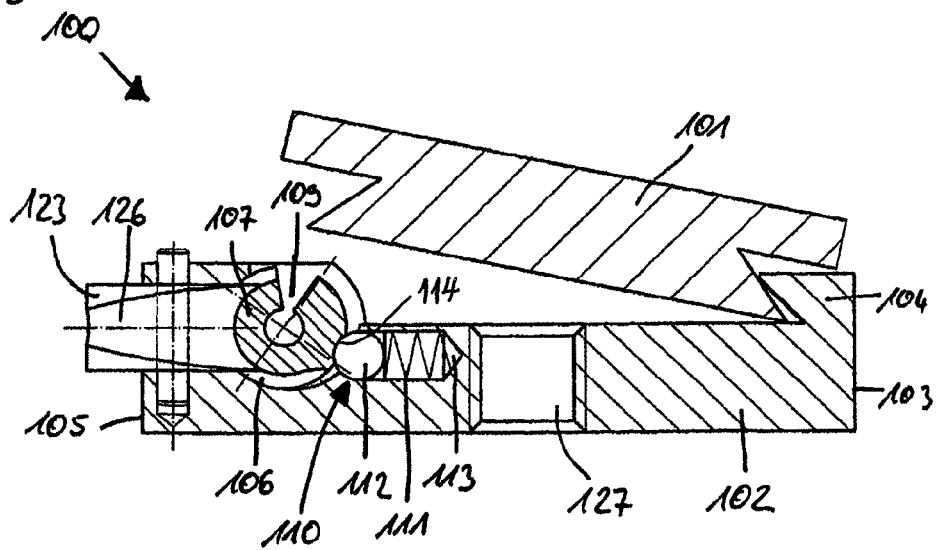
FIG. 3 is a cross section through the holding device with halfway latched exchangeable plate, and on FIG. 4 is a top view of the holding device.

FIG. 3 shows a second, open position of the clamping device 107, in which the exchangeable plate 101 can be removed from above or inserted from above. During insertion of the exchangeable plate 101 in the open position, the exchangeable plate 101 is first hooked unilaterally in the fixed guide rail 104 and then lowered, as illustrated. As the exchangeable plate 101 is placed on the clamping device 107, the contact pressure turns the latter into the closed position.

The latching device 110 consists of a spring 111 and a latching ball 112, which is arranged in a hole 113 in the base 102, roughly centrally from the clamping device 107, and interacts with a spherical depression 114 in the clamping device 107. The latching device 110 imparts a defined location to the open position of the clamping device 107.

As evident from a comparison of FIGS. 1 and 3, the clamping device 107 is impacted by the latching ball 112, which is pressed against the circumference of the clamping device 107 by the spring 111. The circumference of the clamping device 107 is provided with the preferably spherical or otherwise spheroid depression 114, in which the latching ball 112 back into the removal position during the transfer of a torque and rotation of the clamping device 107. As the exchangeable plate 101 provided on the camera is levered out of the clamping device 107, it does not yet swivel completely into its removal position; rather, the clamping device 107 is first rotated completely into the removal position by the torque generated via the latching balls 112 moving in the depression 114. In this removal position, the exchangeable plate 101 with its spring provided on the adjacent longitudinal edge can swivel into the clamping device 107 without any extensive threading in the complementarily shaped longitudinal groove.

Also arranged on the clamping device 107 is a safeguard 115, which prevents the clamping device 107 from inadvertently turning and thereby detaching the exchangeable plate 101. For this purpose, as evident from FIG. 4, a spring pin 116 having three different diameters 117, 118 and 119 is incorporated in the base 102 in the longitudinal direction 128 next to the clamping device 107, and a notch is arranged on the collar 108 of the clamping device 107. In the closed position of the clamping device 107, the notch abuts the medium diameter portion 118 of the spring pin 116, thereby blocking a rotational movement of the clamping device 107. The larger diameter 117 lying further inward abuts the collar 108 in the longitudinal direction 128, and prevents the spring pin 116 from falling out of the hole 121 in both positions of the clamping device 107. To open the safeguard 115, the spring pin 116 must now be inwardly against the spring 120, so that the part 119 with the lowest diameter lies opposite the collar circumference, and the notch is disengaged, releasing the clamping device 107 for rotation. Lifting the exchangeable plate 101 out of the guide turns the clamping device 107 into the open position.

To prevent the exchangeable plate 101 from shifting in the dovetail guide, the clamping device 107 can additionally be moved in the transverse direction 122 as well. For this purpose, the groove 106 is somewhat larger in the transverse direction 122 of the base 102 than the diameter of the clamping device 107, thus enabling a linear motion.

Provided to actuate the clamping device 107 is a control element 123 that is rotatably mounted on the base 102 and exhibits a cam wheel 124 that interacts with the clamping device 107. As a result, a rotation of the control element 123 is turned into a transverse movement of the clamping device 107.

Figure 4:
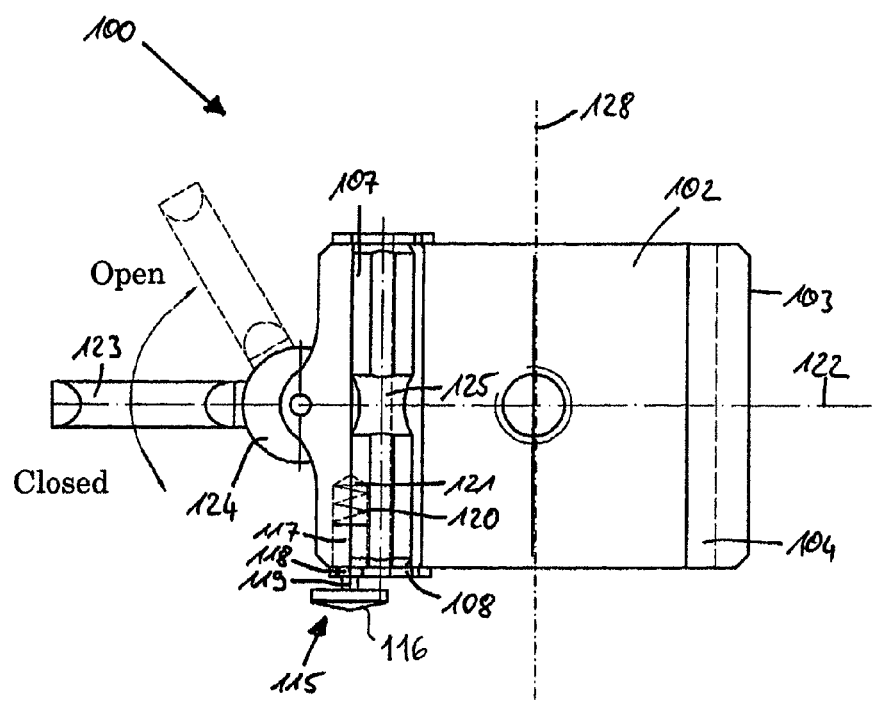

As evident from FIG. 4, the clamping device 107 has a continuous spherical groove 125 in the working region of the control element. The circumference of the cam wheel 124 exhibits an also spherical groove 126, which becomes deeper over the circumference to reflect the eccentricity, and interacts with the groove 125 in the clamping device 107. This spherical groove 126 is necessary, since the clamping device 107 is also rotatable.

Not depicted is an additional safety pin, which prevents the possibility of the exchangeable plate 101 being inadvertently pushed out of the guide.

The holding device 100 with the rotatable clamping device 107 makes it easy to insert even heavy or awkwardly shaped optical instruments on the tripod head 1. The user here does not have to bend over or take the bothersome step of feeling around for the guide in the mounting device 100. In addition, the ball head 2 according to the invention makes it possible to reliably position and lock in place heavy instruments, since the uniform clamping of the ball joint 5 correspondingly increases the carrying power by comparison to prior art.

Reference List
1 Tripod head
2 Inclination apparatus
3 Bearing housing
4 Upper end
5 Ball joint
6 Threaded extension
7 Slide bearing
8 Bearing surface
9 Clamping ring
10 Abutment
11 Longitudinal central axis
12 Inclined surface
13 Counter-inclination
14 Threaded hole
15 Threaded bolt
16 Outer end
17 Hand wheel/impinging element
18 Inner end
19 Gap
20 Weakened material section
21 Bushing
22 O-ring
23 Edge
24 Bushing
25 Bushing
100 Holding device
101 Exchangeable plate
102 Base
103 Longitudinal side (fixed)
104 Guide rail (fixed)
105 Longitudinal side
106 Groove
107 Clamping device
108 Collar
109 Opening
110 Latching device
111 Spring
112 Ball
113 Hole
114 Depression
115 Safeguard
116 Spring pin
117 Large diameter
118 Medium diameter
119 Small diameter
120 Spring
121 Hole
122 Transverse direction
123 Control element
124 Cam wheel
125 Clamping device groove
126 Cam groove
127 Threaded hole
128 Longitudinal direction

The invention claimed is:

1. A tripod head comprising an inclination apparatus (2) with a universal joint, which includes a ball joint (5) that is mounted so that it can swivel in a bearing housing (3) and accommodated between two slide bearings in the bearing housing (3), of which one of the slide bearings (7) is mounted in the bearing housing (3) so that it can shift axially in a spacing direction of the slide bearings (7), the universal joint is arranged between connecting points situated at ends of the inclination apparatus (2) facing away from each other, of which one is adapted to be connected with a camera, a spotting scope, a pair of binoculars or similar optical instrument, or a holding device, and the other is adapted to be connected with at least one tripod leg or similar holder, the bearing housing (3) includes a clamping ring (9) that can expand at a gap and has an inclined surface (12) that tapers relative to a longitudinal central plane toward the ball joint (5), and the inclined surface (12) interacts with a complementarily shaped counter-inclination (13) on the axially shifting slide bearing (7).

2. The tripod head of claim 1, wherein the clamping ring (9) has a weakened material section (20) located generally opposite the gap (19).

3. The tripod head of claim 1, wherein an impinging element (17) is provided that has a generally conical end (18) that engages into the gap (19) of the clamping ring, and is rotatably mounted in a threaded hole (14) of the bearing housing (3).

4. A tripod comprising a holding device (100) for accommodating a camera, a pair of binoculars, a spotting scope or similar optical instrument with an exchangeable plate (101), a base (102) for mounting to a tripod or similar supporting frame, which is provided with a dovetail guide with a guide rail (104) for shiftably mounting the exchangeable plate (101) and a clamping device (107) that can move relative to the base (102) for securing the exchangeable plate (101) in the guide rail (104), the guide rail (104) of the dovetail guide is longitudinally molded onto the base (102), and the clamping device (107) has two positions, in which the exchangeable plate (101) is accommodated so that it can shift in the guide in a closed position, and the exchangeable plate (101) is released for accommodation purposes in an open position, the clamping device (107) can be transferred from the open position into the closed position by placement of the of the exchangeable plate (101) that can be connected with the optical instrument, a longitudinal side (105) of the base (102) lying opposite the guide rail (104) has arranged on it a groove (106) in which the clamping device (107) which is cylindrical is mounted so that it can rotate around a longitudinal axis, which has a longitudinally oriented, segmented opening (109) that forms a counter-guide of the dovetail guide, and the clamping device (107) is provided with a spring-loaded safeguard (115) to prevent inadvertent turning of the clamping device (107), wherein the clamping device (107) is shiftable linearly transversely to the longitudinal axis in order to fix the exchangeable plate (101) in place, and has a rotatably mounted control element (123) for manual activation, along with means (124) for transferring a rotational motion of the control element (123) into a linear motion of the clamping device (107).

5. A tripod comprising a holding device (100) for accommodating a camera, a pair of binoculars, a spotting scope or similar optical instrument with an exchangeable plate (101), a base (102) for mounting to a tripod or similar supporting frame, which is provided with a dovetail guide with a guide rail (104) for shiftably mounting the exchangeable plate (101) and a clamping device (107) that can move relative to the base (102) for securing the exchangeable plate (101) in the guide rail (104), the guide rail (104) of the dovetail guide is longitudinally molded onto the base (102), and the clamping device (107) has two positions, in which the exchangeable plate (101) is accommodated so that it can shift in the guide in a closed position, and the exchangeable plate (101) is released for accommodation purposes in an open position, the clamping device (107) can be transferred from the open position into the closed position by placement of the of the exchangeable plate (101) that can be connected with the optical instrument, a longitudinal side (105) of the base (102) lying opposite the guide rail (104) has arranged on it a groove (106) in which the clamping device (107) which is cylindrical is mounted so that it can rotate around a longitudinal axis, which has a longitudinally oriented, segmented opening (109) that forms a counter-guide of the dovetail guide, and the clamping device (107) is provided with a spring-loaded safeguard (115) to prevent inadvertent turning of the clamping device (107), and an inclination apparatus (2) with a universal joint, which includes a ball joint (5) that is mounted so that it can swivel in a bearing housing (3) and accommodated between two slide bearings in the bearing housing (3), of which one of the slide bearings (7) is mounted in the bearing housing (3) so that it can shift axially in a spacing direction of the slide bearings (7), the universal joint is arranged between connecting points situated at ends of the inclination apparatus (2) facing away from each other, of which one is adapted to be connected with a camera, a spotting scope, a pair of binoculars or similar optical instrument, or a holding device, and the other is adapted to be connected with at least one tripod leg or similar holder, the bearing housing (3) includes a clamping ring (9) that can expand at a gap and has an inclined surface (12) that tapers relative to a longitudinal central plane toward the ball joint (5), and the inclined surface (12) interacts with a complementarily shaped counter-inclination (13) on the axially shifting slide bearing (7).

\* \* \* \* \*